United States Patent [19]
Geyer et al.

[11] Patent Number: 5,653,549
[45] Date of Patent: Aug. 5, 1997

[54] UNLOCKABLE CONNECTING DEVICE BETWEEN TWO OBJECTS, MORE PARTICULARLY USABLE IN SPACE

[75] Inventors: Freddy Geyer, Tanneron; Gérard Vezain, Mandelieu, both of France

[73] Assignee: Aerospatiale Societe Nationale Industrielle, France

[21] Appl. No.: 574,730

[22] Filed: Dec. 19, 1995

[30] Foreign Application Priority Data

Dec. 19, 1994 [FR] France ................... 94 15239

[51] Int. Cl.⁶ .................. F16B 31/00; F16B 21/00
[52] U.S. Cl. ............... 403/321; 403/32; 403/2; 411/390; 411/5
[58] Field of Search .................. 411/390, 391, 411/1–5; 403/2, 11, 15, 31, 32, 322, 321; 89/1.8, 1.14, 1.1

[56] References Cited

U.S. PATENT DOCUMENTS

| | | | |
|---|---|---|---|
| 3,196,745 | 7/1965 | Sustrich et al. | 89/1.14 |
| 3,352,192 | 11/1967 | Carr | 411/431 |
| 3,408,890 | 11/1968 | Bochman, Jr. | 411/391 |
| 4,171,663 | 10/1979 | Day et al. | 89/1.14 |
| 4,779,826 | 10/1988 | Kiendl | 244/173 |
| 5,119,555 | 6/1992 | Johnson | 411/390 X |
| 5,123,794 | 6/1992 | Pire | 411/383 |
| 5,471,888 | 12/1995 | McCormick | 403/2 X |

FOREIGN PATENT DOCUMENTS

| | | |
|---|---|---|
| 0454564 | 10/1991 | European Pat. Off. . |
| 2560303 | 8/1985 | France . |
| 2598383 | 11/1987 | France . |

*Primary Examiner*—Anthony Knight
*Attorney, Agent, or Firm*—Hayes, Soloway, Hennessey, Grossman & Hage, P.C.

[57] ABSTRACT

An unlockable connecting device between two objects is provided. The device includes a connecting member for connecting the objects when the device is in a connected state, and an elastic system for applying to the connecting member a tensile stress for breaking the connecting member when the device is in a separation state. The tensile stress is caused by expansion of the elastic system as a result of elastic resiliency of the elastic system.

20 Claims, 1 Drawing Sheet

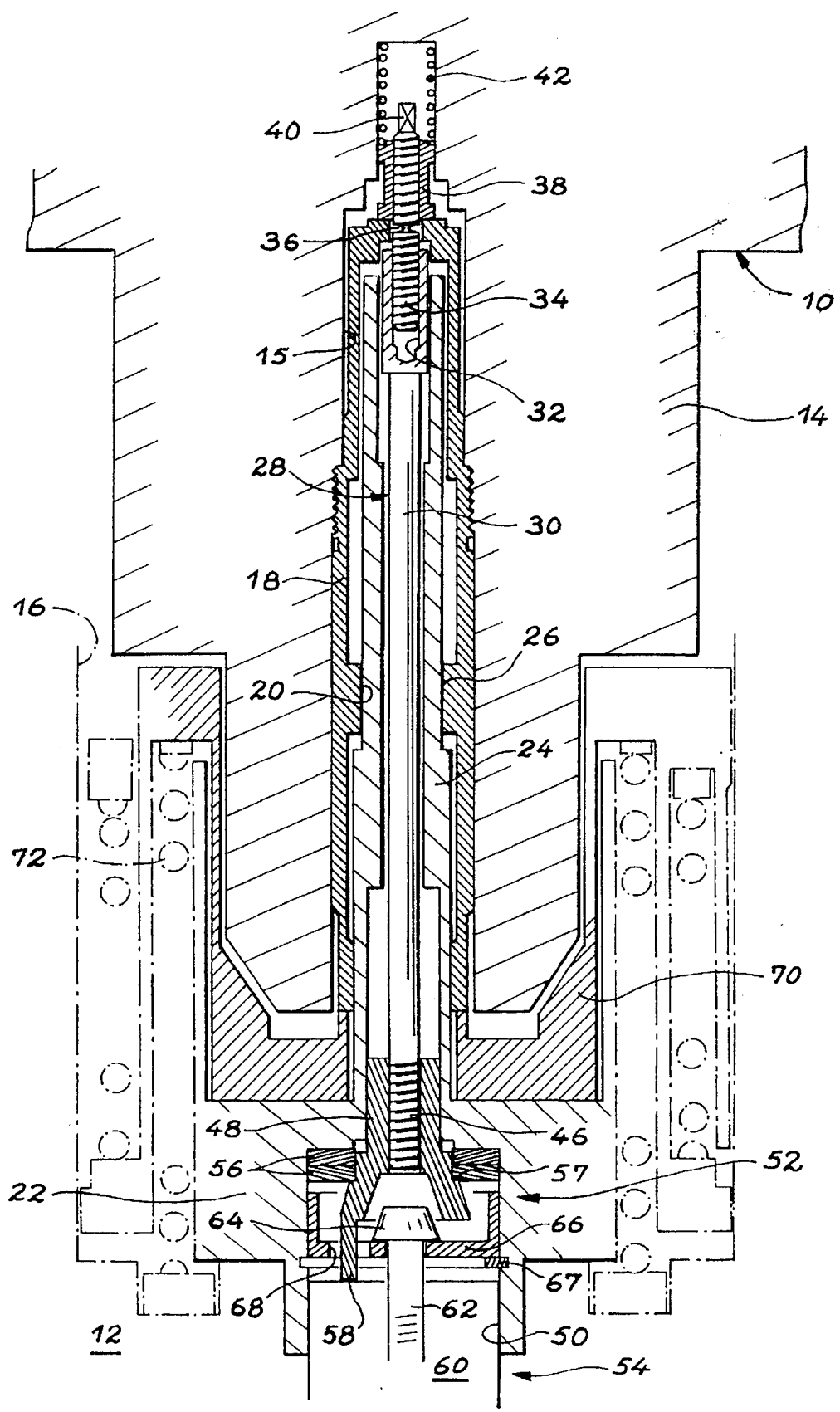

UNLOCKABLE CONNECTING DEVICE BETWEEN TWO OBJECTS, MORE PARTICULARLY USABLE IN SPACE

BACKGROUND OF THE INVENTION

1. Field of the Invention

The invention relates to a rapidly unlockable connecting device for provisionally connecting two objects, whilst bringing about the minimum disturbance of the attitude and relative velocity of said two objects at the time of their separation.

A preferred use of such a device is in the launching and placing in orbit of space objects such as satellites, probes, etc., from a spacecraft such as a launcher, a deep-space probe, etc.

2. Brief Description of Related Prior Art

Existing unlockable connecting devices generally comprise a connecting member by which the two objects are normally connected to one another, unlocking means permitting the separation of the connecting member into two sections connected to each of the objects and initiating means able to actuate the unlocking means. The implementation of generally pyrotechnic, initiating means actuates the unlocking means, which has the effect of separating the connecting member into two sections.

In a first family of devices, more particularly illustrated by FR-A-2 661 466 and U.S. Pat. No. 3,196,745, the unlocking means comprises a segmented nut, normally kept engaged on threaded parts of each of the two sections of the connecting member, e.g. by a locking ring normally surrounding said nut. The effect of the actuation of the initiating means is to axially displace the ring with respect to the segmented nut, which is consequently then separated from the two sections of the connecting member, so that the two objects are no longer interconnected.

In a second family of unlockable connecting devices, the separation of the connecting member into two sections is ensured by the breaking of a fragile part of said member.

In each of these two families, the existing unlockable connecting devices are generally associated with ejection means, which apply between the objects an ejection force making it possible to move them apart when separation takes place. These ejection means are generally incorporated into the connecting device and in certain cases can also be outside said device.

No matter whether separation takes place by the opening of a segmented nut or by the breaking of a fragile part, the existing unlockable connecting devices are generally designed in such a way that the ejection energy, i.e. the energy for bringing to a relative velocity the objects in question, is supplied by initiating means in the same way as the energy used for separating the objects. In other words, the bringing to the relative velocity of the objects is ensured by the excess energy released by the initiating means during their operation and not used for the separation.

The particular consequence of this feature is that the ejection velocity is directly dependent on the force necessary for the separation of the objects. Therefore the ejection velocity can vary significantly, particularly when the separation of the objects takes place through the breaking of a fragile part.

Moreover, in the case where the separation is ensured by the breaking of a fragile part, it may be necessary to give said part a large cross-section, in order to enable it to withstand the loads applied thereto during launch. The energy necessary for breaking said fragile part can therefore be very high compared with the energy required for ejection, particularly when a low ejection velocity is desired.

Bearing in mind the conventionally used technologies, the combination of these two aspects makes the ejection velocity generally of a very random nature. In addition, the direct use of initiating means, usually of a pyrotechnic nature, for ensuring ejection, makes the direction of the ejection arbitrary.

Finally, the existing unlockable connecting devices make the performance of numerous ramp tests relatively onerous, because a large number of parts suffer damage after each test and must consequently be replaced.

SUMMARY OF THE INVENTION

The present invention is specifically directed at an unlockable connecting device with an original design, in which the implementation of the initiating means leads to the application of a tensile stress to the connecting member connecting the two objects when separation occurs, so that the velocity and direction in which separation takes place are not influenced by the operation of the initiating means and in which numerous tests can be performed on the ground at a reduced cost using cold gases.

According to the invention, this result is achieved by means of an unlockable connecting device between two objects, comprising a connecting device normally connecting the objects, unlocking means able to separate the connecting member into two sections connected to each of the objects, and initiating means able to actuate the unlocking means, characterized in that the unlocking means incorporates elastic means, whose release, controlled by the initiating means, has the effect of applying a tensile stress to the connecting member.

Thus, the separation of the objects takes place when the latter are engaged against one another by the elastic means. The ejection force supplied by an external device, as well as the direction in which ejection takes place, can thus be perfectly controlled.

In a preferred embodiment of the invention, the two sections of the connecting member are normally connected by a fragile part, which can be broken by the tensile stress exerted on the connecting member by the elastic means, during the operation of the initiating means.

Advantageously, the elastic means is interposed between a first of the objects and a shoulder formed on a first end of the connecting member. The initiating means is then fitted in the first object and normally lock the first end of the connecting member in a prestressed state of the elastic means.

In this case, the initiating means advantageously comprises a segmented nut, on which normally bears the first end of the connecting member, a screw screwed into said nut and whose head normally bears against an anchoring part mounted in the first object, and pyrotechnic means able to segment the said nut.

In the preferred embodiment of the invention, the connecting member preferably comprises a cylindrical rod, whereof one threaded end carries a tapped part forming the first end of the connecting member.

The first object then has a cylindrical cutout, coaxial to the cylindrical rod and in which is received the elastic means, the tapped part, the head of the screw and the anchoring part. The latter is maintained in the cylindrical cutout by a detachable member such as a circlip.

The nut is then placed in the cylindrical cutout from the other side of the anchoring part and the latter has at least one opening traversed by a finger of the tapped part. The end of the said finger normally bears against the nut.

In the preferred embodiment of the invention, the fragile part is formed on a threaded rod, which can be screwed into a tapped end of the cylindrical rod, opposite to its threaded end. The connecting member also has a locknut, which can be screwed onto one end of the threaded rod projecting out of the cylindrical rod.

The device can then additionally comprise a sleeve which can be fixed to the second object, said sleeve surrounding the cylindrical rod and having an end trapped between the tapped part and the cylindrical rod.

BRIEF DESCRIPTION OF THE DRAWING

The drawing is a longitudinal sectional view of the unlockable connecting device according to the invention associated with an ejection device.

DETAILED DESCRIPTION OF PREFERRED EMBODIMENT

A description will now be given of a preferred, non-limitative embodiment with reference to the attached drawing in the form of a longitudinal sectional view of the unlockable connecting device according to the invention associated with an ejection device.

The spacing control device and the ejection device associated therewith and which are shown in the single drawing are interposed between an object 10 to be ejected, such as a satellite or a probe, and an object 12 serving as a support for the object 10 during its launch. The object 10 is e.g. constituted by a spacecraft such as a launcher, a deep-space probe, etc.

The object 10 incorporates a tubular part 14 projecting over its outer surface. This tubular part 14 normally penetrates a cylindrical cavity 16 formed on the outer surface of the spacecraft 12 or a part integral with the latter, when the object 10 is connected to the spacecraft 12 by an unlockable connecting device according to the Invention.

Along its axis the tubular part 14 of the object 10 has a blind bore 15 in which is screwed a stepped guide sleeve 18 internally defining a stepped bore 20. The fitting of the stepped guide sleeve 18 in the tubular part 14 is such that the two parts are interconnected in rigid manner.

Within the cylindrical cavity 16, the spacecraft 12 has a cylindrical support 22, fitted coaxially to the cavity 16. When the tubular part 14 of the object 10 is received in the cylindrical cavity 16, said cylindrical support 22 is positioned facing the end of said tubular part 14.

In its central part, the cylindrical support 22 carries a tubular guide mast 24 continuously formed on the support 22. This tubular guide mast 24 is normally received in the stepped guide sleeve 18 and has an outer, stepped surface 26 received in sliding manner in the stepped bore 20.

If it is wished to impart to the object 10 a spin movement during its ejection, the outer, stepped surface 26 of the tubular guide mast 24 has a not shown, helical recess in which is received a not shown finger integral with the stepped guide sleeve 18 and projecting radially to the inside.

The object 10 is normally maintained in the position illustrated in the drawing, i.e. rigidly connected to the spacecraft 12, by an unlockable connecting device according to the invention. It should be noted that the unlockable connecting device can, as a function of the particular case, be independent of the ejection device or integrated into the latter, as illustrated in the drawing. The unlockable connecting device generally has a symmetry of revolution about an axis common to the tubular part 14 and to the cylindrical cavity 16.

The unlockable connecting device by which the object 10 is normally flanged to the spacecraft 12 has a connecting member, designated in general terms by the reference 28, which normally connects the object 10 to the spacecraft 12 in accordance with the axis of the device.

The connecting member 28 mainly comprises a linear, cylindrical rod 30 normally located within the tubular guide mast 24 and coaxial thereto. One end of the said cylindrical rod 30, which projects slightly beyond the end of the tubular guide mast 24, is perforated along its axis by a tapped hole 32. A threaded rod 34, which also forms part of the connecting member 28, is screwed into said tapped hole 32.

Beyond the end of the cylindrical rod 30, the threaded rod 34 has a fragile part 36, constituted by a reduced cross-sectional portion of the threaded rod. This fragile part 36 can in particular be obtained by using an annular groove of controlled depth on the threaded rod 34.

The threaded rod 34 traverses a central opening formed in an end wall of the stepped guide sleeve 18 in accordance with the axis of the device. The fragile part 36 is located in said hole. Beyond the end wall of the sleeve 18 and the fragile part 36, a locknut 38 is screwed onto the threaded rod 34, so as to bear against the end face of the stepped guide sleeve 18. Beyond said nut 38, the threaded rod 34 has a manipulating square 40.

A helical compression spring 42, which is weakly scaled, is interposed between the nut 38 and the bottom of the blind bore of the tubular part 14, in which is fixed the stepped guide sleeve 18.

The end of the cylindrical rod 30 turned towards the spacecraft 12 has a thread 46 onto which is screwed a tapped part 48. The latter forms the end of the connecting member 28 adjacent to the spacecraft 12. The tapped part 48 has a cylindrical portion slidingly received in the stepped bore 20 formed in the tubular guide mast 24 and a frustum-shaped, widened portion placed in a cylindrical cutout 50 formed coaxially in the cylindrical support 22. The cylindrical cutout 50 formed in the cylindrical support 22 serves to receive the unlocking means 52 and the initiating means 54, which will now be described.

The unlocking means 52 comprises elastic means constituted, in the embodiment shown, by two conical washers 56 fitted in opposition. These conical washers 56 are placed in the cylindrical cutout 50, between the bottom of the cutout turned towards the object 10 and a shoulder 57 formed on the outer surface of the frustum-shaped portion of the tapped part 48.

The larger diameter end of the frustum-shaped portion of the tapped part 48, turned towards the spacecraft 12, carries one or more fingers 58 oriented parallel to the axis of the device. To facilitate the understanding of the drawing, only one finger 58 is shown therein.

The end of each finger 58 normally bears against a segmented nut 60 forming part of the initiating means 54. The number 60 is also received in the cylindrical cutout 50 of the cylindrical support 22. It can in particular be a pyrotechnic nut able to break up into several segments under the effect of the explosion of a not shown, pyrotechnic charge also forming part of the initiating means 54.

The nut 60 is normally screwed onto a screw 62, whose head 64 is turned towards the tapped part 48. Both the screw 62 and the nut 60 are also located in accordance with the axis of the unlockable connecting device.

An anchoring part 66 is interposed between the nut 60 end the end of the frustum-shaped portion of the tapped part 48 carrying the fingers 58. The anchoring part 66 is kept in the cavity 50 by a circlip 67.

The anchoring part 66 is traversed by each of the fingers 58 of the tapped part 48. For this purpose it has one or more openings 68. The anchoring part 66 is also centrally traversed by the screw 62, so that the head 64 of the said screw normally bears on the face of the anchoring part 66 turned towards the tapped part 48.

To reduce to the greatest possible extent the axial dimensions of the device, the frustum-shaped portion of the tapped part 48 turned towards the head 64 of the screw 62 has a frustum-shaped cavity in which is received said head 64, which for this purpose has a complimentary, frustum-shaped, outer surface.

In the embodiment shown in the drawing, an ejection device is directly associated with the unlockable connecting device described hereinbefore.

This ejection device comprises an annular piston 70, which is placed in the cylindrical cavity 16 between the cylindrical support 22 and the tubular portion 14 of the object 10. More specifically, the annular piston 70 normally bears against the face of the cylindrical support 22 turned towards the tubular portion 14, as well as on the corresponding end of the stepped guide sleeve 18.

The ejection device also comprises a helical compression spring 72, whose ends respectively bear on the annular piston 70 and in the bottom of the cylindrical cavity 16.

The single drawing shows the unlockable connecting device and the ejection device associated therewith in the state normally occupied by them prior to the ejection of the object 10. In this state, the conical washers 56 are compressed because the nut 60 bears against the ends of the fingers 58 and the head 64 of the screw 62 bears against the anchoring part 66.

The connecting member 28 is tensioned so that the object 10 is kept in a stable position with respect to the spacecraft 12. This tension is obtained by the bearing of the nut 38 against the end wall of the stepped guide sleeve 18, whose opposite end bears against the annular piston 70. The latter is in turn engaged against the cylindrical support 22 against the action of the spring 72.

When the initiating means 54 are operated, the nut 60 is segmented in such a way that it is no longer in engagement with the screw 62. Under the action of the prestress stored in the conical washers 56, the connecting member 28 then tends to move downwards with respect to the drawing, because the ends of the fingers 58 no longer bear against the nut 60. The operation of the initiating meads 54 consequently has the immediate effect of applying a tensile stress to the connecting member 28. This stress engages the object 10 against the spacecraft 12 or more specifically maintains the object 10 in a clearly defined position with respect to the spacecraft.

Moreover, the tensile stress applied to the connecting member 28 during the release of the conical washers 56 has a value higher than the stress necessary for the breaking of the fragile part 36. Consequently part 36 breaks, thus bringing about the separation of the object 10 from the spacecraft 12. A first section of the connecting member 28, comprising the stepped guide sleeve 18, the stepped member 38 and the part of the threaded rod 34 placed in said stepped member or bush, remains connected to the object 10. A second section of the connecting member 28 more particularly comprising the tapped part 48, the cylindrical rod 30 and the part of the threaded rod 34 screwed into the tapped hole 32 of said cylindrical rod remains connected to the spacecraft 12.

According to the invention, the separation action of the object 10 and the spacecraft 12 is consequently performed when a tensile stress for engaging the two objects with one another is applied. Consequently when the ejection device comes into operation for moving apart the object 10 and the spacecraft 12, the relative spacing velocity between the object 10 and the spacecraft 12, as well as the direction of said spacing or moving apart are perfectly controlled and essentially depend on the ejection device. In particular, the ejection velocity is determined by the prestress stored in the spring 72 and the ejection direction is determined by the cooperation of the stepped guide sleeve 18 with the guide mast 24.

The fitting of the unlockable connecting device described hereinbefore takes place in the following way.

Firstly, into the cylindrical recess 50 are introduced the conical washers 56, the tapped part 48 and the end of the screw 62 having the head 64. This assembly is trapped in the cylindrical recess 50 on putting into place the anchoring part 66, which is locked with the aid of the circlip 67.

Due to the fact that neither the cylindrical rod 30, nor the object 10, nor the piston 70 are then in place, the screw 62 is then screwed into the nut 60 with the aid of a tool traversing the central hole of the tapped part 48 and whose end is complimentary to a not shown, hollow manipulating portion of the head 64 of the screw 62. Screwing is continued until the conical washers 56 are entirely compressed, as shown in the drawing.

The operator then screws the cylindrical rod 30 into the tapped part 48 with the aid of a wrench cooperating with a not shown, manipulating region formed at the end of said rod projecting beyond the end of the tubular guide mast 24. The threaded rod 34 is then screwed into the tapped hole 42 with the aid of a wrench placed on the manipulating square 40.

The operator then places on the tubular guide mast 24 the annular piston 70 and the stepped guide sleeve 18, which he maintains in place by screwing the nut 38 onto the threaded rod 34. The annular piston 70 serves as an abutment for the locking of the nut 38. More specifically, said locking or tightening is terminated when the annular piston 70 bears against the cylindrical support 22 following the compression of the spring 72.

The unlockable connecting device according to the invention is then ready to receive an object 10, which is put into place by screwing the tubular port 14 of said object onto the stepped guide sleeve 18. Due to the fact that only the threaded rod 34 is damaged during a ramp test, the means described hereinbefore makes it possible to perform numerous tests in a rapid and inexpensive manner.

Obviously, the invention is not limited to the embodiment described. Thus, the initiating means 54 can assume a different form without passing beyond the scope of the invention. As has also been stated, the ejecting device can be completely separate from the unlockable connecting device. It should also be noted that instead of forming a part of the cylindrical support 22, the mast 24 can form part of the annular piston 70.

We claim:

1. A connecting device for releasably connecting a first and second object, comprising a breakable connecting member adapted to connect the objects by drawing the objects against one another with a predetermined tightening force in a connected state of the device; elastic means interposed between said first and second objects and the connecting member to apply to the connecting member a tensile strength sufficient to break said breakable connecting member in a separation state of the device; and, a releasable locking mechanism carried by said first object, and normally maintaining said elastic means in a compressed state, to remove said tensile stress in the connected state of the device, and adapted to release said elastic means in the separation state of the device.

2. A device according to claim 1, wherein the connecting member includes two sections normally connected by a fragile part which is breakable by the tensile stress exerted on the connecting member by the elastic means, during said separation state.

3. A device according to claim 2, wherein the elastic means is interposed between the one of the objects and a shoulder formed on a first end of the connecting member, and initiating means are for causing said device to enter said separation state is fitted in the one object and normally locks the first end of the connecting member in a prestressed state of the elastic means.

4. A device according to claim 3, wherein the initiating means includes a segmentable nut on which normally bears the first end of the connecting member, a screw screwed into said nut and whereof a head normally bears against an anchoring part fitted in the one object, and pyrotechnical means for segmenting said nut.

5. A device according to claim 4, wherein the connecting member comprises a cylindrical rod having a threaded end which carries a tapped part forming the first end of the connecting member.

6. A device according to claim 5, wherein the one object has a cylindrical cutout, coaxial to the cylindrical rod and in which is received the elastic means, the tapped part, the head of the screw, and the anchoring part, the latter being locked in the cylindrical cutout by a detachable member.

7. A device according to claim 6, wherein the nut is located in a cylindrical cutout from one side of the anchoring part, the latter having at least one opening traversed by a finger of the tapped part, an end of said finger normally bearing against the nut.

8. A device according to claim 5, wherein the fragile part is formed on a threaded rod, which is screwed into a tapped end of the cylindrical rod, opposite to said threaded end, and in which the connecting member also comprises a locknut, which is screwed onto one end of the threaded rod projecting out of the cylindrical rod.

9. A device according to claim 8, and further comprising a sleeve which can be fixed on the other object, said sleeve surrounding the cylindrical rod and having an end trapped between a tapped bush and the cylindrical rod.

10. A device according to claim 9, and including an ejection device, comprising a piston and a spring, interposed between the sleeve and the one object.

11. A device according to claim 1, wherein said elastic means comprises at least one conical washer inserted between a shoulder formed on the connecting member and said one of said objects.

12. A device according to claim 11, wherein said releasable locking mechanism is adapted to act on at least one finger extending from one end of the connecting member adjacent to said shoulder.

13. A connecting device for releasably connecting two objects, comprising a breakable connecting member normally connecting the objects, unlocking means for separating the connecting member into two sections connected to each of the objects, and initiating means for actuating the unlocking means, wherein the unlocking means incorporate elastic means, whose release, controlled by the initiating means, applies a tensile stress to the connecting member, said connecting member comprising two sections normally connected by a fragile part, which is breakable by the tensile stress exerted on the connecting member by the elastic means, during an operation of the initiating means, said elastic means being interposed between a first of the objects and a shoulder formed on a first end of the connecting member and the initiating means being fitted in the first object and normally locking the first end of the connecting member in a prestressed state of the elastic means, and wherein the initiating means incorporate a segmentable nut on which normally bears the first end of the connecting member, a screw screwed into said nut and whereof the head normally bears against an anchoring part fitted in the first object, and pyrotechnical means for segmenting said nut.

14. A device according to claim 13, wherein the connecting member comprises a cylindrical rod having a threaded end which carries a tapped part forming the first end of the connecting member.

15. A device according to claim 14, wherein the first object has a cylindrical cutout, coaxial to the cylindrical rod and in which is received the elastic means, the tapped part, the head of the screw and the anchoring part, the latter being locked in the cylindrical cutout by a detachable member.

16. A device according to claim 15, wherein the nut is located in a cylindrical cutout from one side of the anchoring part, the latter having at least one opening traversed by a finger of the tapped part, an end of said finger normally bearing against the nut.

17. A device according to claim 14, wherein the fragile part is formed on a threaded rod, which is screwed into a tapped end of the cylindrical rod, opposite to said threaded end, and in which the connecting member also comprises a locknut, which is screwed onto one end of the threaded rod projecting out of the cylindrical rod.

18. Device according to claim 17, and further comprising a sleeve which can be fixed on the other object, said sleeve surrounding the cylindrical rod and having an end trapped between a tapped bush and the cylindrical rod.

19. Device according to claim 18, and including an ejection device, comprising a piston and a spring, interposed between the sleeve and the first object.

20. A connecting device for releasably connecting two objects, said device comprising:

a. a breakable connecting member for connecting said objects when said device is in a connected state;

b. elastic means interposed between one of said objects and the connecting member, for applying to the connecting member a tensile stress for breaking said connecting member, said tensile stress being caused by expansion of said elastic means as a result of elastic resiliency of said elastic means when said device is in a separation state; and c. a releasable locking mechanism carried by said one of said objects for causing compressive force to be applied to said elastic means when said device is in said connected state sufficient to overcome said elastic resiliency so as to hold said elastic means in a compressed state relative to when said elastic means expands when said device is in said separation state, said tensile stress being unapplied to said connecting member by said elastic means when said elastic means is in said compressed state, said mechanism being adapted to release said elastic means from said compressed state when said device is in said separation state and to thereby permit said expansion of said elastic means as a result of said elastic resiliency of said elastic means.

* * * * *